2,819,951
APPARATUS FOR THE REGENERATION OF CATALYST

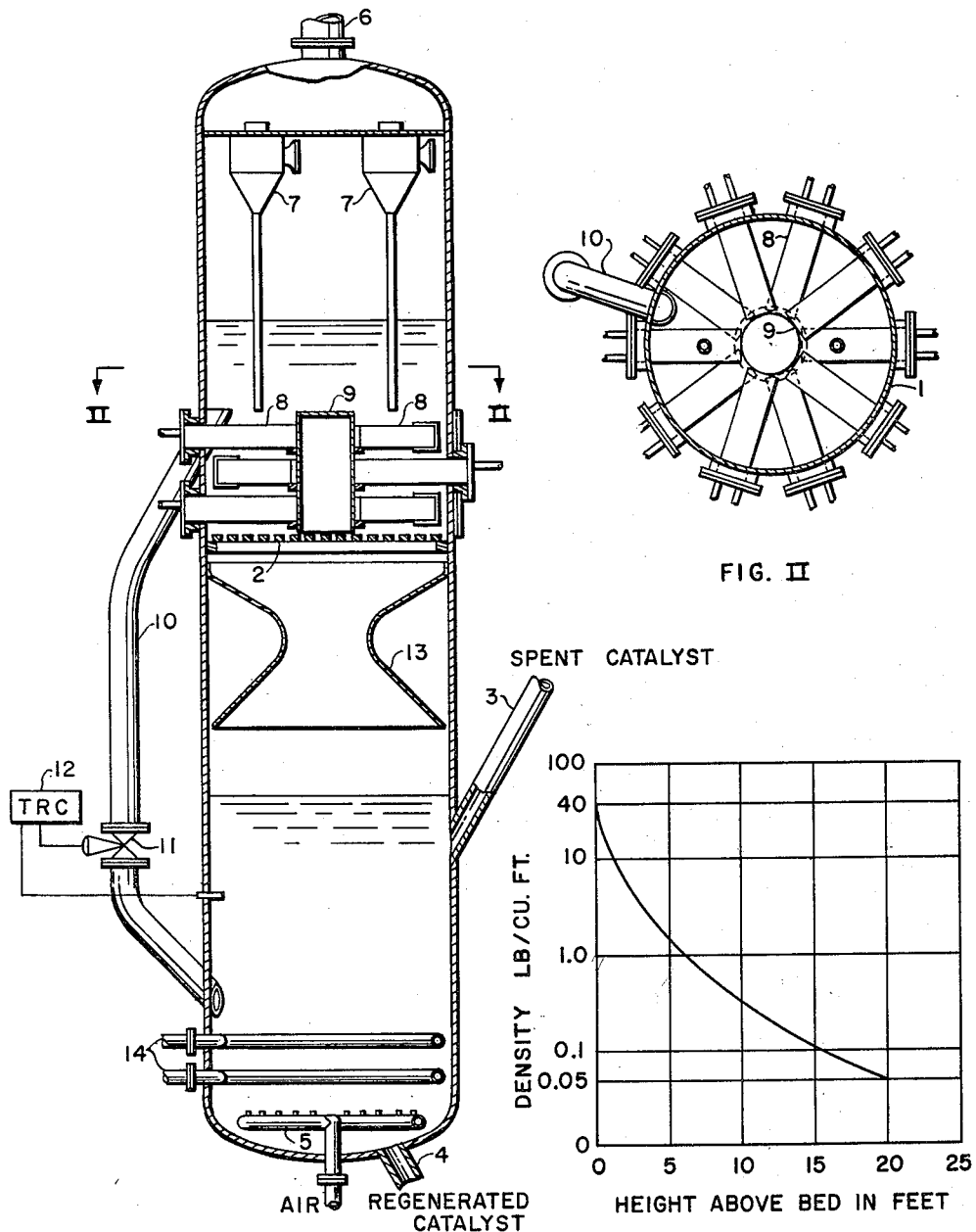
FIG. II
FIG. I
FIG. III
INVENTORS:
WILLIAM V. MEDLIN
GEORGE E. LIEDHOLM
BY: *James Todorovic*
THEIR ATTORNEY Jan. 14, 1958 W. V. MEDLIN ET AL 2,819,951
APPARATUS FOR THE REGENERATION OF CATALYST
Filed Feb. 23, 1955 2 Sheets-Sheet 2
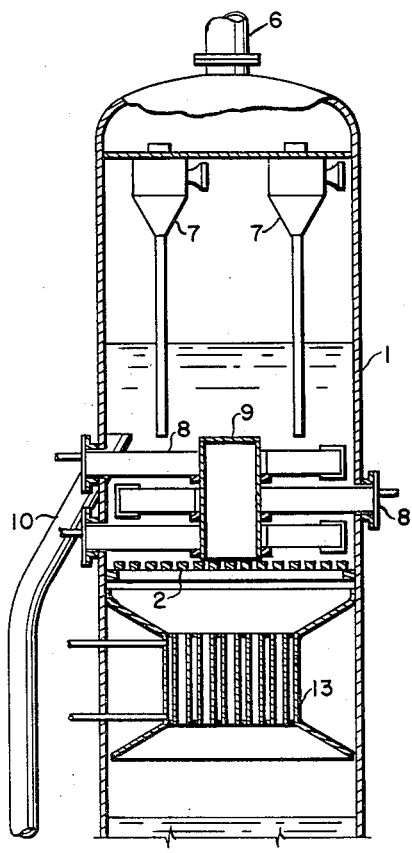
FIG. V
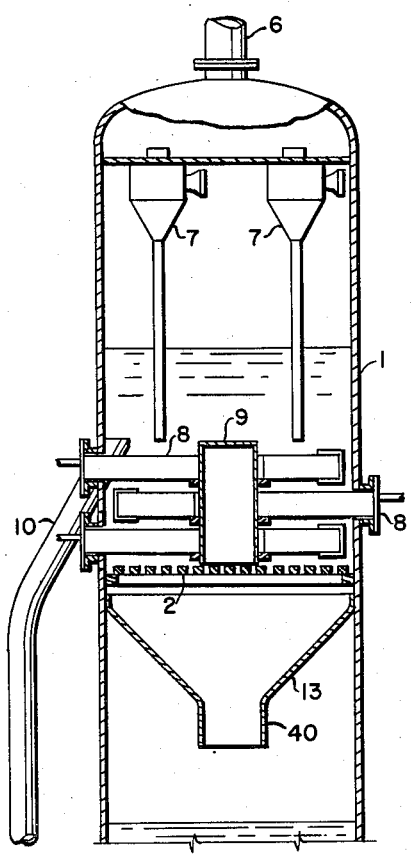
FIG. IV
INVENTORS:
WILLIAM V. MEDLIN
GEORGE E. LIEDHOLM
BY: James Todorovic
THEIR ATTORNEY United States Patent Office
2,819,951
Patented Jan. 14, 1958

William V. Medlin and George E. Liedholm, Berkeley, Calif., assignors to Shell Development Company, New York, N. Y., a corporation of Delaware Application February 23, 1955, Serial No. 489,892

6 Claims. (Cl. 23—288)

This invention relates to the continuous regeneration of finely divided catalyst using the fluid catalyst technique. More particularly, it relates to regeneration of powder form spent cracking catalyst by the burning of combustible carbonaceous deposits therefrom with air or oxygen under controlled temperature conditions.

In the catalytic cracking of hydrocarbon oils using the fluidized catalyst technique a certain amount of the feed oil is converted to coke-like matter which remains on the catalyst and lowers its effectiveness by blocking its surface. The used catalyst containing such carbonaceous material is therefore continuously cycled from the cracking zone to a separate regeneration zone wherein the carbonaceous matter is removed by burning with air. The thus regenerated catalyst is cycled back to the cracking zone. In conventional catalytic cracking using the fluidized catalyst technique, the rate of catalyst circulation through the cracking and regeneration zones is large, being, for example of the order of 20 tons per minute in a typical case. Although the burnable carbonaceous material represents only a small percent of the weight of the spent catalyst, it is sufficient to heat the catalyst to a quite high temperature upon burning. The catalyst on the other hand, is well known to become rapidly and permanently deactivated if it is overheated. For this reason it is essential and the practice to maintain the temperature in the regeneration zone at a safe level which is usually about 1000 to 1100° F.

Part of the heat of combustion in the regeneration is transferred to the reaction zone with the hot catalyst and is therefore utilized in the process to heat the feed oil. Part is removed as sensible heat in the regenerator flue gas. The remaining heat beyond the small amount lost by radiation must be removed and this is usually done by indirect heat exchange with the body of fluidized catalyst undergoing regeneration at the regeneration temperature. This arrangement while it is widely used, has certain shortcomings. Generally the amount of heat to be removed is quite large, even though it may represent only a minor amount of the total heat liberated in the regeneration. The removal of this large amount of heat is complicated by the fact that the heat transfer means are very costly to install and difficult to maintain. It is frequently the practice to preheat the catalytic cracking feed stock in a separate preheater. This decreases the amount of sensible heat removed from the regenerator by the catalyst and increases the amount of heat available for steam generation. Also the regenerator flue gas leaves the regenerator at essentially the regeneration temperature. At the normal temperature of about 1100° F., heat economizers for the flue gas are both costly and not very efficient, and in consequence, such economizers are rarely economical. Also, and especially when starting up a catalytic cracking unit or when changing feed stock composition, excessive coke deposition and rapid rise in regenerator temperature are sometimes encountered. In order to prevent severe damage, it is necessary to operate with especial care under relatively conservative conditions, since the normally used cooling facilities have no rapid and responsive high surge load capacity.

The process and apparatus of the present invention overcome these shortcomings. Not only do they allow a much greater steam production capacity by removing sensible heat from both the catalyst and the flue gas without recourse to extra heat economizers, but they also afford a large surge cooling capacity which in any emergency can be applied instantly and automatically to prevent damage to the catalyst and to the apparatus. The process and apparatus of the invention also allow a particularly simple and safe automatic control of the temperature and other advantages which will be more particularly pointed out below.

The process of the invention in outline comprises continuously feeding finely divided spent catalyst from a reactor or separate reaction zone to a separate regeneration zone wherein the finely divided catalyst is maintained as a fluidized bed and wherein the carbonaceous deposits are burned with air or oxygen which passes up through the bed of the catalyst and in so doing maintains the bed in a fluidized (pseudo-liquid) state. Regenerated catalyst is continuously withdrawn from the fluidized bed in the regeneration zone and cycled back to the reaction zone. The fluidized bed of catalyst in the regeneration zone is maintained at the desired regeneration temperature; e. g., 1060° F., by means later to be explained. Above the level of the fluidized bed of catalyst in the regeneration zone, there is a disengaging zone wherein the concentration of catalyst suspended in the regeneration gas issuing from the bed decreases with height above the bed level. The level of the bed of fluidized catalyst in the regeneration zone is maintained automatically at such a height that a substantial concentration of catalyst (sufficient to fulfill the cooling requirements) is conveyed upward through the disengaging space in the gas. This suspension is then passed upward through a constricted passage, where the velocity is increased, to a second or upper zone of, again increased cross section, where the velocity is again reduced and the spent catalyst drops out to form a second fluidized bed above the first. The temperature in the second or upper fluidized bed is maintained materially below that of the lower zone, e. g., 500° F., by indirect heat exchange. The flue gases, after passing through this second zone, are discharged at essentially the lower temperature of this zone and catalyst at this lower temperature is passed from this second zone by gravity to the first or lower zone at a rate controlled to exactly supply the desired cooling to the lower (higher temperature) regeneration zone. The amount of catalyst so transferred is, by virtue of the arrangement used, identical to the amount of catalyst transferred from the lower to the upper zone in suspension with the flue gas.

The process will be described in further detail in connection with the accompanying drawings, wherein Figure I illustrates in cross sectional elevation a preferred form of the regeneration apparatus in which the process may be carried out.

Figure II is a cross sectional plan view of the apparatus of the Figure I in the plane II—II.

Figure III is a graph showing (in a typical case) the concentration of catalyst in the disengaging space above the lower catalyst bed level as a function of the distance above the bed level.

Figures IV and V are cross sectional elevations of the upper part of the apparatus of Figure I modified in certain particulars to be described.

Referring to Figures I and II, the apparatus comprises an upright cylindrical vessel 1 which may be perfectly cylindrical or it may be swedged to a somewhat different diameter in the upper section. The apparatus is provided with a grid 2 or distributor plate having a free (open) area from about 1 to 10% which divides the vessel into an upper zone and a lower zone. Suitable conduit means 3 and 4 are provided for the introduction of carbonized catalyst into the lower zone and for the withdrawal of regenerated catalyst by gravity from the lower zone respectively. Means 5 are also provided near the bottom of the lower zone for the introduction and distribution of air for burning the carbonaceous material from the spent catalyst. A conduit 6 for discharging spent regeneration gases is provided at the top of the upper zone. Suitable separators 7 are provided in the upper part (disengaging space) of the upper zone to prevent excessive loss of catalyst by suspension in the effluent spent regeneration gases.

Cooling coils having ample heat transfer capacity are provided in the lower part of the upper zone above the grid 2. In the apparatus illustrated, these coils are in the form of fifteen tube bundles 8 leading into the shell 1 radially such that they are supported at one end by the shell and at the other end by a central pier 9, which is supported by the grid 2. The bundles are arranged in three tiers of five each. The individual bundles are provided with suitable valved lines (only the ends of which are shown) which are suitably manifolded and connected to a steam boiler. The piping is arranged such that any individual bundle may be cut out of service at will without affecting the steam producing capacity of the others.

The apparatus is also provided with a down-coming standpipe 10 connecting the lower parts of the upper and lower zones and arranged to afford a gravity flow of catalyst from the upper to the lower zone. This line is provided with a control valve 11 arranged to be automatically controlled by a temperature recorder controller (TRC) 12 which is responsive to changes in temperature in the lower part of the lower zone, i. e. the fluid bed of catalyst therein.

On the one hand, in order to effect even moderately efficient distribution of gas into a fluidized bed of catalyst, it is found that a distributor must be used which exerts a pressure drop of at least about ½ pound per square inch. It is for this reason that the free area of the grid 2 is of the order mentioned. On the other hand, the only driving force to cause gravity flow from the upper zone to the lower zone in line 10 is a small difference in "hydrostatic head." Thus, the hydrostatic head of the catalyst in line 10 minus the pressure drop across the valve 11 (about 1 pound per square inch) must exceed the hydrostatic head of the corresponding column within the bed, plus the pressure drop caused by the distributor. In order to obtain this relationship, the apparatus is preferably provided with a constriction between the two zones and below the grid 2. In the apparatus illustrated, this restriction is provided by the constricted skirt 13 which is suspended at the top by the wall of the vessel and extends downward into the lower zone. The restriction should not be so narrow as to add any appreciable drop in pressure in the catalyst suspension passing through it, as its purpose is to increase the pressure head in line 10 with a lesser and minimum increase in pressure in the lower zone.

The apparatus may also be provided with a small coil 14 in the lower part of the lower zone, e. g., for the separate production of some higher pressure steam.

The parts described are arranged to operate in the following manner: Spent catalyst to be regenerated is continuously introduced from a separate reaction zone into the lower or regeneration zone by line 3 and the same amount of regenerated catalyst is continuously removed from the regeneration zone by line 4. In the case illustrated, each of these flows is in the form of a dense pseudo-liquid catalyst mass and is effected by gravity. Air or other regeneration gas is introduced through the distributor 5 at the bottom to burn the carbonaceous deposits. This air passing up through the bed of catalyst in the regeneration zone maintains the catalyst in a pseudo-liquid state. The density of the catalyst bed will depend on the gas rate and upon the particle size distribution and absolute particle density of the catalyst, but will normally be between about 20 and 45 pounds per cubic foot at superficial linear gas velocities between about 1 and 5 feet per second. Under these conditions the catalyst bed exhibits a violently agitated upper level above which the density is very much less and decreases as the distance above the average bed level is increased. This decrease is illustrated for a typical case in the graph shown in Figure III where the average density is plotted against the distance above the bed level.

Referring to Figure III, it will be seen that whereas the density at or just below the bed level is 40 pounds per cubic foot, it drops abruptly at the bed level and at a distance of only 5 feet, it is already only slightly above 1 pound per cubic foot. The curve shown in Figure III is for a typical case in which the entire height above the catalyst bed has the same hydraulic radius.

The suspension of catalyst in spent regeneration gas rising from the catalyst bed travels upward at a uniform average velocity. As soon as it reaches the beginning of the constriction (in this case, the lower end of the constricted skirt 13), its velocity is increased due to the lessened cross section of the passage. At the increased velocity, suspended catalyst no longer tends to settle out (disengage) and, consequently, the density becomes fixed. Thus, for example, if in the case shown in Figure III, the bottom of the skirt were 15 feet above the catalyst bed level, the suspension carried up through the skirt would be about 0.1 pounds per cubic foot. If the distance were 2½ feet, the density would be about 5 pounds per cubic foot. In other words, for the case in question, if the distance between the bed level and the bottom of the skirt is read on the abscissa, the density of the suspension passing up through the skirt and grid 2 to the upper zone is found on the ordinate. However, the skirt is fixed and it is the bed level which varies.

With the rate of catalyst introduction and withdrawal via lines 3 and 4 the same and fixed as usual in catalytic cracking it follows that the density of catalyst passing up through the skirt and grid 2 will always equal the amount of catalyst passed down through line 10 and valve 11. In other words, the bed level in the lower zone under this condition automatically adjusts itself to meet this condition. The suspension, after passing up through the skirt 13 and grid 2, tends again to settle due to the lowered vapor velocity caused by the increased cross section. This forms the second or upper catalyst bed. The spent regeneration gas, after passing up through the upper bed, passes up through the upper disengaging space to the cyclone separators 7 and then out via line 6. Catalyst separated from the flue gas by cyclone separators 7 is returned to catalyst bed by the cyclone dip legs. The catalyst in the upper bed is cooled, e. g. to 500° F., by coils 8 in the upper section, thereby generating steam. The flue gas leaving the lower bed is substantially free of oxygen and due to this and the low temperature prevailing in the upper bed, no appreciable burning takes place in this upper bed. In passing up through the upper bed which is cooled by cooling coils, the flue gas is cooled to essentially the temperature of the bed and leaves the system via line 6 at essentially this temperature. Thus, the present invention utilizes profitably both the heat of the gas as well as the catalyst, and allows a large increase in production of desirable steam.

As stated above, the lower or regeneration zone requires cooling to prevent overheating of the catalyst. This is effected by gravity flow of cooled catalyst from the upper zone to the lower zone through line 10. This flow is regulated by automatic control of valve 11 in response to changes in temperature as measured in the bed of catalyst undergoing regeneration and, as stated above, no matter what the rate of flow of cooled catalyst may be, the level of the bed in the lower zone automatically and of itself adjusts to transfer the same amount of catalyst to the upper zone through the skirt.

If for any reason such as mentioned above, there is need for a sudden increase in cooling in the regeneration zone, the system described provides a large surge cooling capacity which is immediately available for this purpose. Thus, the opening of valve 11 which is effected automatically, allows a large volume of cooled catalyst to be charged to the regeneration zone from the upper reservoir to effect immediate cooling without any material influence on the rest of the plant.

The temperature in the upper zone may be held at any desired temperature below the desired temperature in the regeneration zone, but is preferably at least 100° F. below the regeneration temperature and more preferably between about 400° F. and 800° F. The lower the temperature the greater is the available surge cooling capacity. The temperature may be raised or lowered as desired by cutting one or more of the tube bundles in or out of service.

Afterburning is the burning of carbon monoxide with small amounts of unconsumed oxygen in the spent flue gas in the disengaging space above the catalyst bed. It is common in conventional catalyst regenerators where the disengaging space is purposely held quite high in order to minimize the loading and eroding of the cyclone separators. It is highly undesirable and is normally held under control by the injection of steam or spray water in the disengaging space near the cyclone separators. It normally does not occur where the concentration of catalyst is appreciable. Due to the comparatively high catalyst density, the good mixing, and the small volume in the disengaging space of the lower zone, little if any difficulty with afterburning is encountered in the present process in the lower zone and it cannot take place in the upper disengaging zone because of the low temperature prevailing therein.

Figure IV shows the vertical cross section of the apparatus of Figure I in which the construction is modified. Like parts are indicated by like reference numbers. The skirt shown in Figure I is suspended at its top from the shell and forms only a loose sliding fit with the shell at its bottom. The contour of the skirt is rounded to present easy flow of the catalyst suspension with minimum erosion. The space between the skirt constriction and the shell is dead space and serves no useful purpose in itself. For practical purposes the outward flare of the skirt near the bottom can be dispensed with. The skirt 13 shown in Figure IV is essentially such a skirt. While this type of constriction is aerodynamically not as good, it has, nevertheless, practical advantages. Thus, while a skirt such as shown in Figure I can be constructed of suitable length, taking into account the density of the fluid catalyst and the free area of the grid 2 or equivalent distributor, to ensure the necessary flow through line 10, the resulting system is limited in catalyst driving force (from the upper to the lower bed) by the height of the skirt and this is not easily changed. It frequently happens that due to increased capacity obtained by removing other plant bottlenecks, changing to a feed stock which produces more coke, change from a ground catalyst to a synthetic microspheroidal catalyst, or the like, it is desired to alter the maximum catalyst flow rate through line 10. In the apparatus illustrated in Figure II, this can be done by either shortening or lengthening the narrow cylindrical part 40. As the cylinder is lengthened (as can be done easily at any shutdown by welding on an additional length) the driving force to cause flow down through line 10 is increased, and vice versa.

The fifteen tube bundles 8 of the particular example present a heat transfer surface of about 19,000 square feet which allows production of steam at a rate of about 140 million B. t. u. per hour when the temperature in the upper zone is maintained at about 500° F. In order to support the cooling tubes within the vessel, a grid 2 of the strongest construction is required. This is largely due to the fact that this grid is subjected to the catalyst suspension at essentially the regeneration temperature. In the apparatus illustrated in Figure V the constricted passage is made up of a number of smaller tubes 50 passing between tube sheets 51 and surrounded by coolant. The heat transfer surface possible here is insufficient by itself to effect the cooling desired in the system but is sufficient to precool the spent regeneration gas containing suspended catalyst to an extent allowing a less costly and heavy construction of the grid and supporting members. Also it allows a minor amount of high temperature steam to be produced. If the latter is desired this intermediate cooler is connected to a separate steam boiler.

In addition to the advantages described above, the process and apparatus of the invention afford other advantages. Thus, for example, the cyclone separators 7 must be designed to handle the gas volume at a velocity below that causing excessive erosion. Since the gas rising from the upper bed is relatively cool compared to the normal regeneration gas, its volume is considerably less and the cyclone separators need not be so large. Also, it is known that such cyclone separators last much longer when operated at relatively cool temperatures, particularly if they are not subjected to occasional afterburning. In addition, if the diameter of the upper zone is at least equal to that of the lower zone, the superficial velocity of the gas in the upper zone is correspondingly less and consequently the entrainment to the cyclones is less. Since the loss of solids through cyclone separators is a direct function of the loading, the loss through the cyclones is therefore less. This is particularly important in such areas as the vicinity of Los Angeles, California, where, because of the severe smog problem, the maximum allowable discharge of solids into the atmosphere is only 40 pounds per hour in a unit such as this where the catalyst circulation rate is about 1200 tons per hour.

The apparatus and process of the invention are particularly designed and applicable in the catalytic conversion of hydrocarbon oils, especially catalytic cracking. The cracking catalyst may be composed of microspheroidal particles produced by spray drying, or of irregular particles produced by grinding larger pieces, or of particles of any other shape or size capable of being handled by the fluidized catalyst technique. The invention is not limited as to the composition of the catalyst used. Thus, it is equally applicable with the so-called clay type cracking catalysts including by way of example activated clay catalysts and synthetic compositions of silica-alumina, silica-magnesia, silica-zirconia, silica-alumina-aluminum fluoride, silica-alumina-aluminum phosphate, and alumina-boria, which catalysts may or may not contain promoters, activators, or stabilizers such as compounds of Cr, Mo, F, Cl, Be, B and the like.

The regeneration gas is generally air but may be commercial oxygen, air fortified with oxygen, or other gaseous oxidizing agents such as chlorine, nitric oxide, or the like.

While it is obviously desirable to produce steam with the heat obtained by cooling, the invention is not limited to this as the heat may be utilized in any other way which might be desired, e. g., to heat oil.

It will be understood that the invention is not limited to the precise apparatus illustrated nor to various inconsequential details of the mode of operation described, but that the principles herein described may be applied in various modifications which will be apparent to those skilled in this art.

We claim as our invention:

1. Apparatus for the regeneration of catalyst containing combustible carbonaceous deposits by burning the combustible carbonaceous deposits therefrom which comprises a vertically arranged apparatus having two interconnecting zones, namely, an upper cooling zone adapted to contain a bed of fluidized catalyst and a lower burning zone adapted to contain a second bed of fluidized catalyst, a grid between said lower and upper zones arranged to distribute spent regeneration gas from said lower zone over the horizontal cross section of said upper zone, a zone of restricted cross section between said upper and lower zones and below said grid, a conduit provided with a control valve interconnecting said two zones and arranged to insure passage of fluidized catalyst from the upper fluidized bed to the lower fluidized bed, means responsive to temperature in the fluidized bed in said lower zone arranged to control said control valve, cooling coils within said upper cooling zone said coils consisting of a plurality of separately controlled heat transfer tubes, and separate conduits adapted for the introduction and withdrawal of catalyst from the fluidized bed in the lower zone.

2. In apparatus for the regeneration of fluidized catalyst by burning carbonaceous deposits therefrom under controlled temperature conditions, the combination of an upright cylindrical vessel having approximately midway a grid dividing the volume of said vessel into an upper and a lower zone and arranged to cause distribution of gas passing from the lower zone to the upper of said zones over the cross section of said zone, a constriction in the effective diameter of the vessel in the upper part of the lower zone below said grid, a conduit with control valve outside of said cylindrical vessel connecting the said two zones of the vessel and adapted to transfer catalyst by gravity flow from the upper to the lower of said zones, means for automatically regulating said control valve in response to changes in the temperature in said lower zone, cooling coils in the upper zone above said distributing means said coils consisting of a plurality of separately controlled tubes adapted for the regeneration of steam, and separate conduits adapted for the introduction and withdrawal of catalyst to and from the lower zone of said vessel.

3. Apparatus according to claim 1 further characterized in that said zone of restricted cross section consists of a plurality of cooled parallel open ended pipes arranged to partially cool the suspension of catalyst in regeneration gas passing from the burning zone to the upper cooling zone.

4. Apparatus according to claim 1 further characterized in that said cooling coils in the upper zone consist of a plurality of separately controlled tubes adapted for the regeneration of steam.

5. Apparatus according to claim 4 further characterized in that said separately controlled cooling coils consist of tube bundles extending through the cylindrical vessel radially to a central support.

6. Apparatus according to claim 1 further characterized in that said zone of restricted cross section immediately below said grid is defined by a truncated cone extending from the periphery of the gas distributing means to an attached depending open ended cylinder which extends downward and is within the lower zone.

References Cited in the file of this patent

UNITED STATES PATENTS

| | | |
|---|---|---|
| 1,922,220 | Sprague | Aug. 15, 1933 |
| 2,383,636 | Wurth | Aug. 28, 1945 |
| 2,462,861 | Gunness | Mar. 1, 1949 |
| 2,463,912 | Scharmann | Mar. 8, 1949 |
| 2,601,676 | Trainer | June 24, 1952 |
| 2,604,384 | Border et al. | July 22, 1952 |
| 2,631,981 | Watson et al. | Mar. 17, 1953 |
| 2,650,155 | Medlin | Aug. 25, 1953 |
| 2,677,604 | Nelson | May 4, 1954 |
| 2,690,056 | Bergstrom | Sept. 28, 1954 |
| 2,692,864 | Gerhold | Oct. 26, 1954 |
| 2,694,623 | Welty | Nov. 16, 1954 |